United States Patent [19]

Wirick

[11] Patent Number: 4,634,854

[45] Date of Patent: Jan. 6, 1987

[54] MOVING APERTURE DEVICE FOR REDUCING SCATTERED LIGHT IN AN OPTICAL SYSTEM

[75] Inventor: Michael P. Wirick, Los Angeles, Calif.

[73] Assignee: The United States of America as represented by the Secretary of the Air Force, Washington, D.C.

[21] Appl. No.: 690,541

[22] Filed: Jan. 10, 1985

[51] Int. Cl.⁴ ............................................. H01J 3/14
[52] U.S. Cl. .................................. 250/216; 250/234; 350/276 R
[58] Field of Search ............... 250/216, 221, 228, 578, 250/236, 229, 234–235; 350/612, 619, 276 R, 277, 278; 354/226, 241, 244

[56] References Cited

U.S. PATENT DOCUMENTS 3,488,103 1/1970 Webb ..................................... 350/58
3,535,514 10/1970 Cardile .............................. 250/49.5
3,648,056 3/1972 Buttweller et al. ................. 250/239
4,316,652 2/1982 Auer, Jr. et al. ................ 350/276 R Primary Examiner—Eugene R. LaRoche
Assistant Examiner—D. C. Mis
Attorney, Agent, or Firm—Stanton E. Collier; Donald J. Singer

[57] ABSTRACT

In order to reduce the amount of internally scattered radiant energy in an optical system having a collecting optical chamber and a secondary optical chamber, a moving aperture device is positioned in a first focal plane between the chambers; the aperture device has a continuous moving metal band that has staggered slits therein. The band is sprocket driven and cryogenically cooled to reduce thermal emission. The band can be synchronized with other scanning detectors in the optical system such as one might find in an infrared telescope used in outer space.

9 Claims, 2 Drawing Figures

MOVING APERTURE DEVICE FOR REDUCING SCATTERED LIGHT IN AN OPTICAL SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to optical systems, and, in particular, relates to devices to reduce scattered light inside the optical system.

Electro-optical detectors are generally operated in conjunction with primary optical systems for gathering and focusing the "target" radiation from a desired source, toward which the optical axis of the system is accordingly directed. It is essential to the operation of such devices that interference from off-axis radiation be restricted. This stray radiant energy can be the result of self-emission of the instrument structure, radiation from distant non-target sources, and internally scattered light and poses a critical problem in connection with numerous devices, such as electro-optical trackers, radiometers, coronagraphs, and spectro-photometers. A particularly acute need for stray radiation shielding is experienced in connection with electro-optical target detectors. Successful operation of the detector is dependent upon the "source" signal reception being maintained at a detectable level relative to the limiting system noise. Since the intensity of the target source is generally low, interference from even a weak source off the target axis can cause the system to generate erroneous signals.

A common means in the past for restricting stray radiation involves the placing of a cylindrical tube in front of the primary optical system so as to restrict the view factor of the entrance aperture. The interior of the tube is typically coated with a radiation-absorbing material, and means are often provided for cooling the device to reduce the effects of self-emission. This technique has a serious drawback, however, in that to be very effective the ratio of the length of the cylinder to its diameter must be relatively large. This can severely limit the use of such a device, for example, on airborne or space vehicles.

Improvements have been made on the cylindrical shield by placing in the cylinder one or more relatively thin plates or baffles with knife-edged apertures in their centers to form a "tube-baffle shield." Again, the theory of operation of these baffles is simply to shield the optics from off-axis radiation by reducing the view factor of the primary optics.

Even the best of the prior-art shielding devices are severely limited in their ability to attenuate stray radiation. Their limitations center around the fact that in most cases the effects of self-emission and internal reflections have gone uncorrected. Current attempts to improve the devices have generally been concentrated on structuring the internal surface of cylindrical-type shields. These, however, have met with limited success. For example, in the "tube-baffle shield" the number of baffles can be increased to increase shielding, but the number is limited by space, and as the number is increased, so is the area which can produce undesirable internal reradiation and reflection of off-axis energy. Furthermore, a practical limit exists because after a certain point very little increase in attenuation results from the addition of more knife-edge baffles, due to edge diffraction and scatter.

In the double monochrometer having two chambers, for example, some scattered light is discriminated against by the second spectral sorting of the second chamber. Scattering is also reduced by an entry slit between the two chambers thereby limiting the amount of light that can be transmitted from the first to the second monochrometer chamber. This device greatly reduces also the amount of non-scattered light thus making detection more difficult.

Other techniques used have been polarization discrimination, super polished optical surfaces, and spectral filtering.

These drawbacks have motivated a search for a device for limiting the amount of internally scattered light that reaches the detector array.

SUMMARY OF THE INVENTION

The present invention overcomes the problems encountered in the past and described in detail hereinabove by providing a moving aperture device which is capable of greatly reducing internally scattered radiation.

This goal is achieved by placing a moving aperture at a focal plane which preceeds the final focal plane. The moving aperture is scanned over a field of view thus giving scattered light rejection over an extended field of view. Scattered light can represent a severe problem in an optical system since it may introduce false signals, reduce image to background contrast and in cases where a bright source object is near the edge of the system field of view, the scattering may be sufficient to completely mask signals from fainter objects within the field of view.

The light from a distant source, firstly, enters a collecting optical chamber which is equivalent to the primary mirror and the surrounding structure. This light passes through one focal plane and enters a secondary optical chamber which is equivalent to a second set of power optics and its surrounding structure. The moving aperture is placed at the first focal plane between the two chambers.

The moving aperture consists of a continuous band of metal with a plurality of staggered openings spaced across the width of band. The openings if they could be placed above each other would form a vertical slit. The band is mounted on a sprocket drive and, as the band is rotated, it passes through a series of cryogenically cooled rollers to reduce thermal emissions of the band. A field stop in the first focal plane is also cryogenically cooled.

The band can be phase locked to be in sync with a multiple element detector such as might be typical of a space telescope for use in the infrared region.

It is therefore one object of the present invention to reduce the amount of scattered light in a portion of the field of view of an extended field of view optical system.

It is another object of the present invention to reduce scattered light by the use of a moving aperture.

It is another object of the present invention to provide a moving aperture device usable in an infrared multi-element detector telescope.

These and many other objects and advantages of the present invention will be readily apparent to one skilled in the pertinent art from the following detailed descrip-

DETAILED DESCRIPTION OF THE PREFERRED EMBODIMENT

Figure 1:
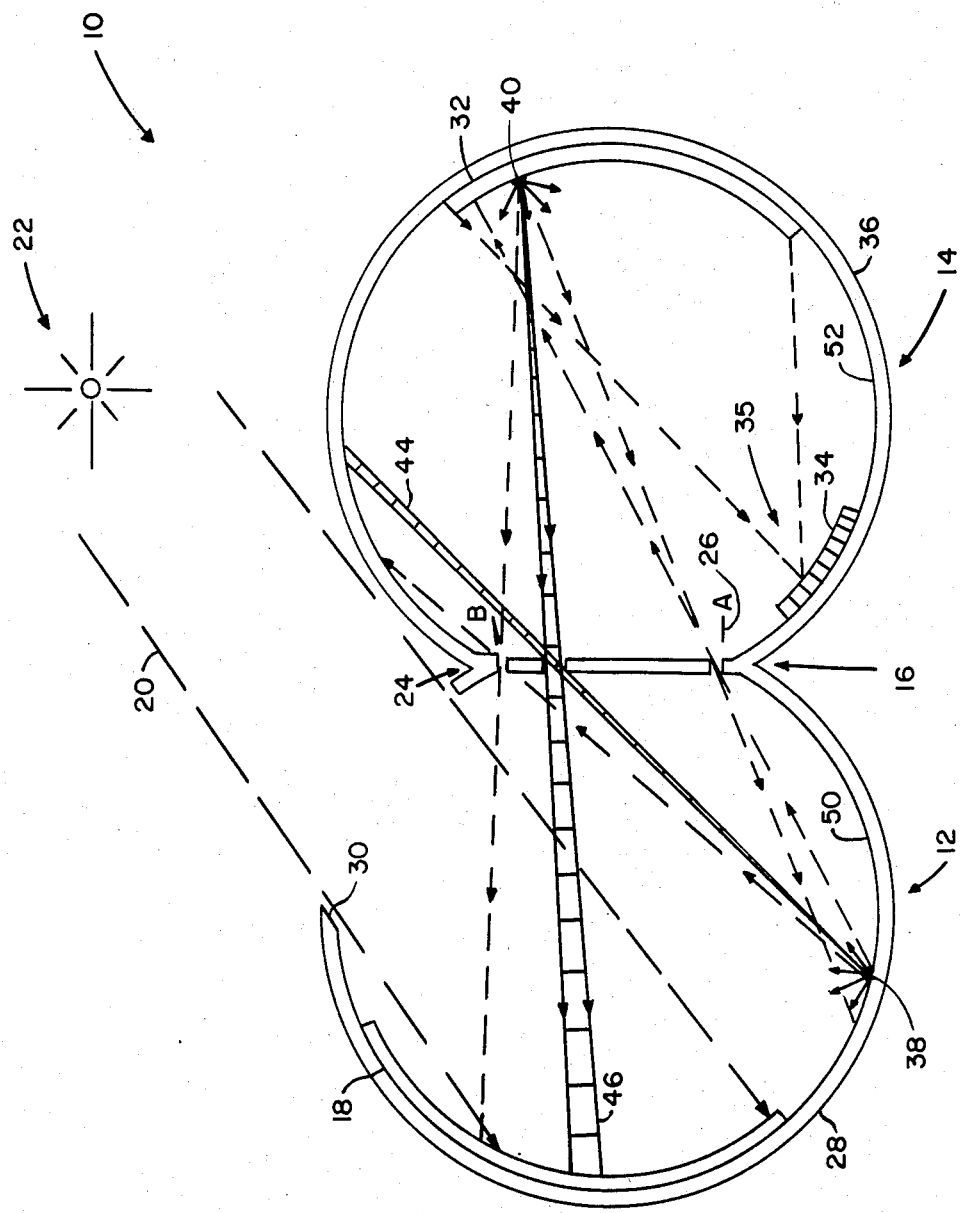
FIG. 1 illustrates the optical system having the moving aperture device of the present invention.

Reference is now made to FIG. 1 which best illustrates one application of the technique to reduce scattered light in an optical system 10 used for the detection of targets.

Figure 2:
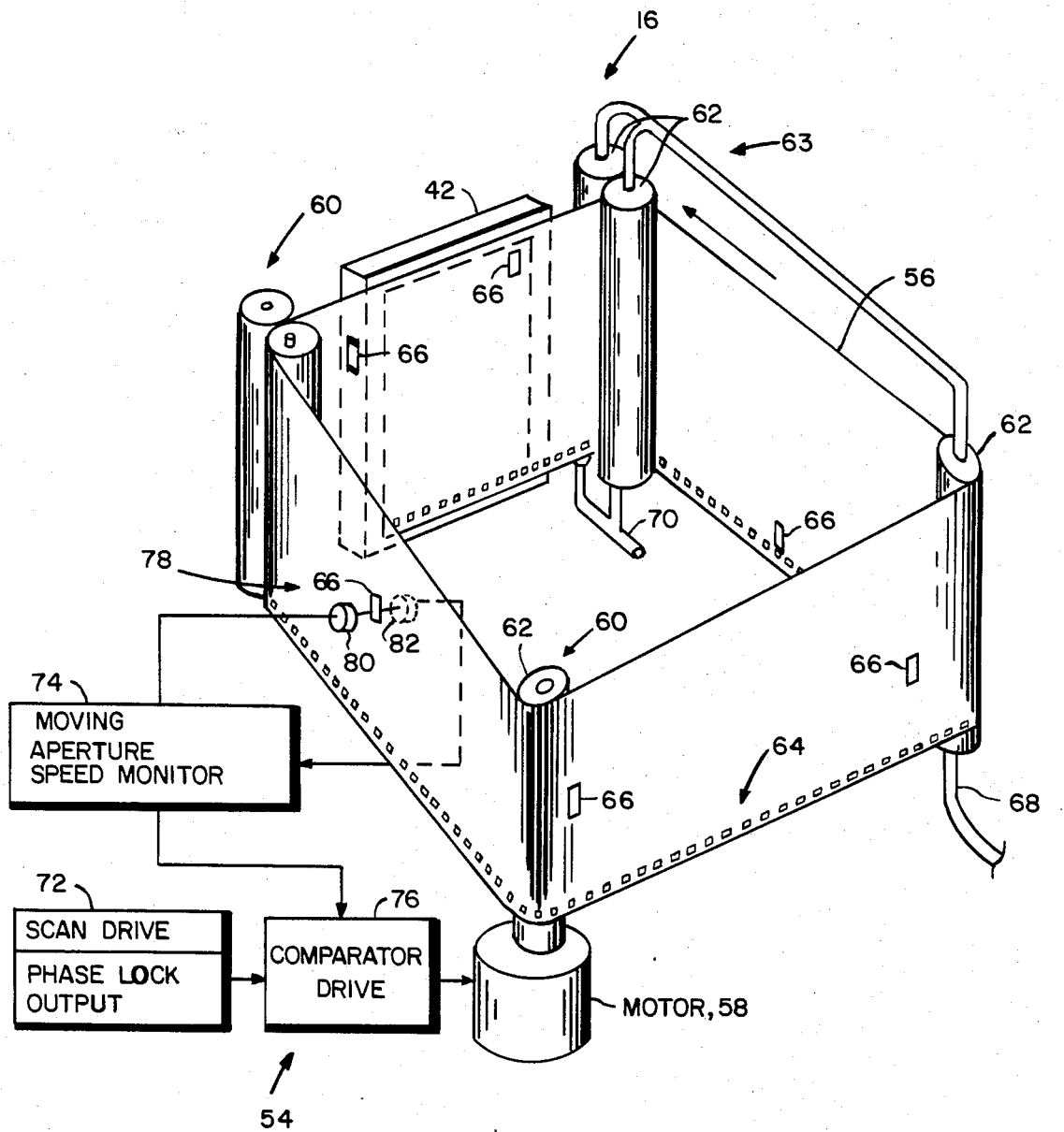
FIG. 2 illustrates the moving aperture device along with an electrical functional block diagram.

Optical sytem 10 has a light collecting optical chamber 12, a secondary optical chamber 14 and a moving aperture device 16, partially shown in FIG. 2, placed at a first focal plane 24 between chambers 12 and 14. Collecting chamber 12 has therein a primary mirror 18 which receives an input beam 20 from a target 22 located at a distance from optical system 10. Collecting optical chamber 12 has a housing 28 that has an input opening 30 for input beam 20. It is understood that housing 28 is only pictorially represented. Primary mirror 18 is able to focus input beam 20 from target 22 over first focal plane 24. First focal plane 24 defines an extended field of view 26 between points A and B.

Secondary optical chamber 14 has therein a secondary mirror 32 that focuses received light onto a detector 34 which can be an infrared detector having a multitude of detector elements 35, shown in cross section, in an array which is electrically scanned.

A scatter source 38 represents any source in collecting chamber 12 delivering rays through a field stop 42, shown in FIG. 2, at angles greater than the field of view defined by field stop 42. A scatter source 40 represents any source in secondary optical chamber 14 whether from a mirrored surface or not.

As seen in FIG. 1, moving aperture device 16 significantly reduces the amount of scattered light from the type of sources described above, i.e., source 38 or source 40, by allowing to pass therethrough, scattered beams 44 or 46 respectively. Additional reduction in scattering is possible if non-mirrored surfaces 50 and 52 of housing 28 and 36, respectively, are made of non-reflective material and by using super polished mirror surfaces.

The reduction in scattered light from sources 38 and 40 can be seen to be proportional to the ratio of the area enclosed within moving aperture device 16 to the total area within field stop 42. This reduction can easily be 1000 times or more. The amount of scattered light contributed by a type of source such as source 38 is generally much greater (about 100 times) than that contributed by a type of source such as source 40. The practical limit to moving aperture device 16 is dependent on the size of the field of view, the image size formed by the collecting optics, and the diffraction at moving aperture device 16.

Diffraction effects are very small because the diffracted rays that reach the secondary optics such as secondary mirror 32 are refocused one-for-one into the image formed by the secondary optics, and the geometry of most practical secondary optics systems precludes any rays being sufficiently diffracted to miss the secondary optical surfaces. When moving aperture device 16 is chosen larger than the image formed by the collecting optics, diffraction effects are minimized; however, an optical system for which moving aperture device 16 is proposed must be thoroughly analyzed from an integrated systems point-of-view for the special diffraction and scattering effects peculiar to its specific design.

Referring to FIG. 2, moving aperture device 16 is illustrated together with drive control electronics 54.

Moving aperture device 16 has a wide continuous metal band 56, a sprocket drive 58, guide rollers 60 and 62, cryogenic cooling means 63, and field stop 42.

Metal band 56 has at one edge a line of sprocket holes 64 that engage, a sprocket, not shown, driven by drive 58. About band 56 are a multitude of staggered slits 66. As each slit 66 scans across field stop 42 a different area is covered and also only one slit 66 is in the extended field of view at one time. In combination, one revolution of band 56 causes the full area of field stop 42 to be scanned by the multitude of slits 66. Band 56 can be made of stainless steel, for example.

In order to reduce thermal emissions from band 56, band 56 is cooled cryogenically. Cooling fluid is pumped into input tube 68 and is removed by output tube 70. The cooling fluid or gas circulates through guide rollers 62 and thus removes heat from band 56 which is in close contact with rollers 62.

In this embodiment, optical system 10 is cryogenically cooled and has scanned multiple element detector 34, shown in partial cross section in FIG. 1. Moving aperture device 16 is phase locked to an optical system scan drive 72 such that when a particular slit 66 is at a given position, the image formed on detector 34 falls on an active element of detector 34.

In order to insure such coordination, a motion detector 78 having a light emitter 80 and a light receiver 82 is positioned on a particular slit 66 path. As that slit 66 passes detector 78, light will be received by light receiver 82. This will occur repeatedly and will be indicative of the speed of band 56 as well as being indicative of the position of band 56 as it passes field stop 42. A moving aperture speed monitor 74 outputs a signal to a comparator drive 76. A phase lock output signal from scan drive 72 is also input into comparator drive 76. When the image formed by slit 66 of band 56 is determined to fall on a sequence of active detector elements then comparator drive 76 will output a drive signal to synchronize band 56 movement to the detector 34 scan movement.

Clearly, many modifications and variations of the present invention are possible in light of the above teachings and it is therefore understood, that within the inventive scope of the inventive concept, the invention may be practiced otherwise than specifically claimed.

What is claimed is:

1. A moving aperture device for substantially reducing internally scattered radiant energy in an optical system having a collecting optical chamber and a secondary optical chamber, said moving aperture device mounted between said chambers in a first focal plane, said moving aperture device comprising:

means for reducing the overall intensity of radiant energy entering into said secondary optical chamber, said means for reducing having therein an extended field of view;

means for scanning across said extended field of view for selectively allowing radiant energy to enter said secondary optical chamber, said means for scanning being a multi-apertured device having a plurality of staggered slits, each of said slits traversing said field of view along different paths, only one of said slits traversing said field of view at any one time, said paths covering said extended field of view;

means for guiding said means for scanning past said extended field of view;

means for driving said means for scanning across said extended field of view;

means for cryogenically cooling said means for scanning to reduce thermal emissions therefrom.

2. A moving aperture device as defined in claim 1 wherein said means for reducing is a field stop.

3. A moving aperture device as defined in claim 1 wherein said apertured device is a flat band, said band having staggered slits.

4. A moving aperture device as defined in claim 3 wherein said slits are rectangular.

5. A moving aperture device as defined in claim 3 wherein said band has sprocket holes located along one edge of said band.

6. A moving aperture device as defined in claim 3 wherein said band is made of stainless steel.

7. A moving aperture device as defined in claim 3 wherein said means for guiding are a plurality of guide rollers for holding said band.

8. A moving aperture device as defined in claim 1 wherein said means for driving is a sprocket drive.

9. A moving aperture device as defined in claim 1 wherein said means for driving said means for scanning further includes:

means for detecting motion of said apertured device of said means for scanning whereby the speed and position of said apertured device is determinable by the motion of a slit on said apertured device;

a scan drive of said optical system, said scan drive activating selectively elements of a detector positioned in said optical system; and a comparator drive for synchronizing said means for scanning and said means for driving, said comparator drive operably connected to said means for detecting motion and said scan drive whereby an image created by said apertured device falls upon an active element of said detector.

* * * * *